United States Patent

Stockman

[11] 3,980,128
[45] Sept. 14, 1976

[54] ROTOR POST SEAL

[75] Inventor: Richard Franklin Stockman, Friendship, N.Y.

[73] Assignee: The Air Preheater Company, Inc., Wellsville, N.Y.

[22] Filed: June 2, 1975

[21] Appl. No.: 583,007

[52] U.S. Cl. ................................. 165/9; 277/56; 277/58; 277/85
[51] Int. Cl.² ......................................... F28D 19/00
[58] Field of Search ............. 165/9; 277/53, 56, 84, 277/85, 91, 58, 187

[56] References Cited
UNITED STATES PATENTS

| | | | |
|---|---|---|---|
| 945,180 | 1/1910 | Ljungstrom | 277/56 |
| 2,666,624 | 1/1954 | Flurschutz | 165/9 |
| 3,822,739 | 7/1974 | Kurschner | 165/9 |

FOREIGN PATENTS OR APPLICATIONS

| | | | |
|---|---|---|---|
| 825,057 | 12/1959 | United Kingdom | 165/9 |

*Primary Examiner*—Albert W. Davis, Jr.
*Attorney, Agent, or Firm*—Wayne H. Lang

[57] ABSTRACT

A sealing arrangement for a rotary regenerative air preheater that precludes the leakage of gas or air through the clearance space between a cylindrical rotor shaft and an end plate of a relatively fixed surrounding housing structure. The sealing arrangement includes an annular flange concentrically fixed at one end to the rotor shaft and adapted to extend into spaced relation with the housing structure to provide a clearance space therebetween. The clearance space is adapted to carry a plurality of discrete bands of packing material with a pressurized air seal therebetween to resist the flow of fluid therethrough, while the annular flange is subjected to wear and attrition that would otherwise be imposed upon the rotor post.

13 Claims, 5 Drawing Figures

ROTOR POST SEAL

SUMMARY OF THE INVENTION

A rotary regenerative heat exchange apparatus usually comprises a rotor post having sectorial baskets that extend radially outward therefrom and contain a mass of heat absorbent material. The baskets are moved alternately between hot and cold fluids in order that heat absorbed from the hot fluid may be transferred to the cold fluid flowing therethrough.

The rotor is surrounded by a housing formed with end plates at spaced ends containing openings therein that simultaneously direct a heating fluid and fluid to be heated through spaced compartments of the rotor containing the heat absorbent material.

Inasmuch as the several fluids flowing through the heat absorbent material of the rotor are maintained at various pressure levels, either above or below the pressure of the surrounding atmosphere, there is considerable tendency toward leakage between high and low pressure fluids and the atmosphere. For these reasons, extensive sealing arrangements must be incorporated into the heat exchanger to effectively isolate the several fluids from one another and from the atmosphere.

This invention relates to a sealing arrangement for the rotor post of a rotary regenerative air preheater of the type shown in U.S. Pat. No. 3,822,738 of July 9, 1974, issued to Herman E. Kurschner. In this patent the inventor provides an arrangement that reduces leakage by providing a seal that is biased axially and radially simultaneously to rub directly against the rotor post in a manner that seals effectively but causes excessive wear and direct attrition of the rotor post. The present invention is directed to sealing arrangement for an air preheater that is adapted to seal against sleeve structure concentrically spaced and independent from the rotor post rather than against the rotor post itself whereby there will be effective sealing but no frictional attrition of a member basic to the structural integrity of the air preheater. Moreover, the sealing arrangement includes an air seal intermediate rubbing seals to provide a continuously effective sealing relationship.

BRIEF DESCRIPTION OF THE DRAWING

The invention will be more fully described with reference to the accompanying drawings in which.

DESCRIPTION OF THE PREFERRED EMBODIMENT

Figure 1:
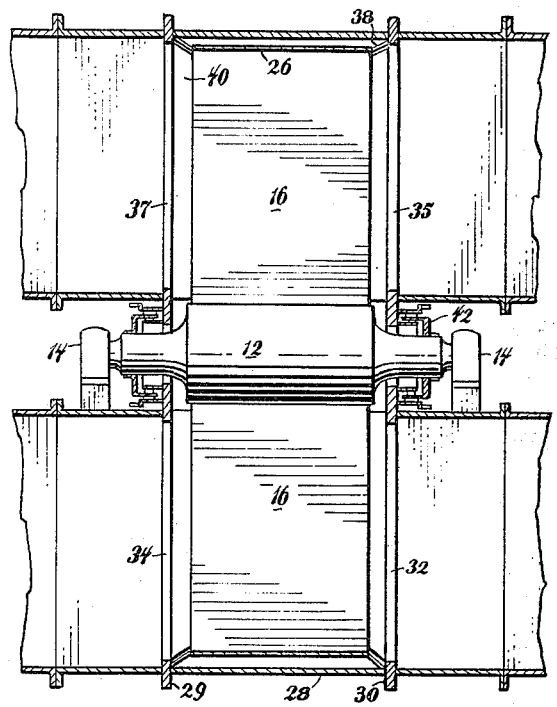
FIG. 1 is a sectional elevation of an air preheater having sealing means constructed in accordance with this invention.

The arrangement of the drawing is directed to a rotary regenerative heat exchanger having a central rotor post 12 supported horizontally on bearings 14 and rotated about its axis by a drive motor not here shown. A mass of heat absorbent material 16 is contained in independent frames or compartments connected to the central rotor post. The rotor is contained in housing structure 28 having end plaes 29–30 with openings 32, 34, 35, and 37 at opposite ends thereof whereby a heating fluid and a fluid to be heated may flow through the heat absorbent material carried by the rotor.

To preclude fluid flowing into or out of the rotor housing through the space between the rotor post 12 and the end plates 29–30, post seals 42 are provided.

Figure 2:
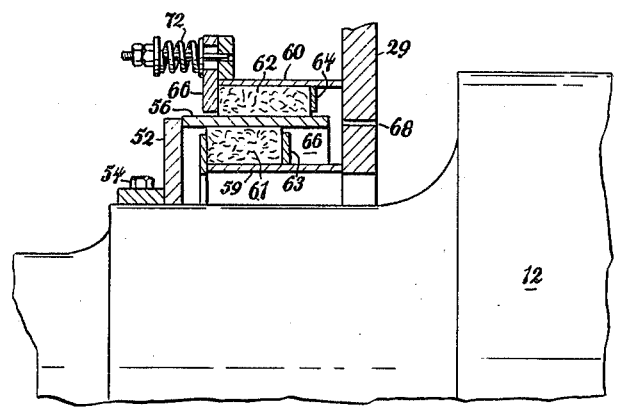
FIG. 2 is an enlarged detail of a preferred embodiment of my invention showing the sealing arrangement intermediate the rotor post and the surrounding housing structure.

In a form of the invention shown in FIG. 2, the sealing device comprises an annular flange 52 that is positioned around and secured to the rotor post by means such as bolts 54 to provide a structural base for an annular sleeve 56 that lies concentric with the rotor post.

The annular sleeve 56 extends axially into the open end of an annular trough comprised of spaced annular flanges 59 and 60 lying around the rotor post and attached to the end plates 29 or 30 completely independent from the rotor post.

The flanges 59 and 60 of the annular trough thus provide a container for a packing material such as glass or rock wool rings 61 and 62 that are packed in chambers on opposite sides of annular sleeve 56 to preclude the flow of fluid therethrough. Access to the space adjacent the inside periphery of annular sleeve 56 is made through suitably covered access openings on the flange 52, while access to the chamber that lies outside annular sleeve 56 is through the closure comprising a series of arcuate segments 66 in end-to-end abutment that are laid completely around the rotor on flange 60 and held in position by a spring biasing means 72. The segments 66 together thus comprise a composite annular cover that extends over the trough into proximity with the annular sleeve to provide a holding means for the packing material 62.

Some leakage will occur between a high pressure zone and the atmosphere, especially after the packing material 62 has become worn away or packed so that it no longer completely fills the clearance space between flanges; however, to preclude leakage of excessive amounts of air or gas through the sealing sealing means, the side walls of the trough are provided with additional oppositely extending flanges 63 and 64 that receive the annular sleeve 56 between ends thereof. The flanges 63 and 64 consequently comprise a barrier that support the bands of packing material 61 and 62 that are forced into the space between flanges, while the space below the flanges comprises an annular air chamber 66. The chamber 66 is provided with a passageway 68 that connects it to a zone of high pressure whereby the chamber 66 may at all times be maintained at an elevated pressure to preclude the flow of a low pressure fluid therethrough.

To further control the leakage of fluid through the packing material on opposite sides of the annular sleeve 56, the packing is arranged to provide substantially more resistance to fluid flowing from air chamber 66 through packing 62 to the atmosphere than from chamber 66 through packing 61 back into the heat exchanger whereby any air that may leak from air chamber 66 will escape back through the packing material on the inside of sleeve 56 and flow back into the air preheater.

Reduced resistance to flow through the packing material 62 is developed by providing the chamber outside sleeve 56 with a lesser amount of packing material than through 61 on the inside of sleeve 56 as determined by placement of the flanges 63 and 64 on the inside walls of the sealing trough. Thus, flange 64 lies close to end plate 29 while flange 63 lies relatively far therefrom whereby the sealing chamber outside sleeve 56 will have greater capacity for packing material than that on the inside of said sleeve.

Figure 5:
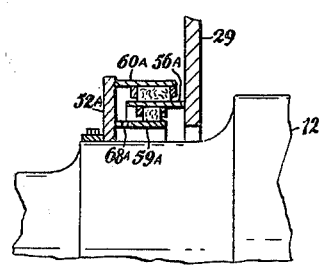

Although it may be preferable to place the packing material in a trough or chamber that is held in a fixed position relative to a movable rotor in the hammer shown in FIG. 2, it would be but a matter of choice to reverse the arrangement and place the packing material 62 in a rotatable trough carried by the flange 52-A in the manner shown by FIG. 5. Here the annular trough comprised of flanges 59-A and 60-A is secured to flange 52-A that is rotated by the rotor post, while the sleeve 56-A carried by end plate 29 remains relatively fixed.

In both arrangements shown in FIGS. 2 and 5 the packing 62 outside flange 56 would be adapted to provide greater resistance to the flow of fluid than the packing 61 inside flange 56 whereby any leakage from air chamber 66 would be back into the heat exchanger.

Figure 4:
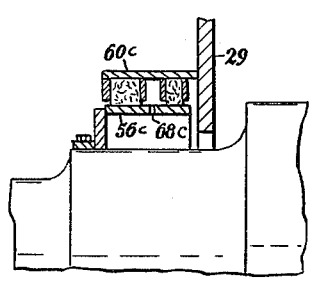

In the form of the invention shown in FIG. 4 the sealing surface lies on the outer periphery of the sleeve 56-C to provide the same relationship between relatively movable members as shown in FIGS. 2 and 5 except annular flange 56-C rotates with the rotor post while flange 60-C remains fixed to the housing. Here, relatively rotatable members 56-C and 60-C may expand or contract axially without altering the sealing relationship therebetween while passageway 68-C permits the flow of air to the air chamber between bands of packing material.

Figure 3:
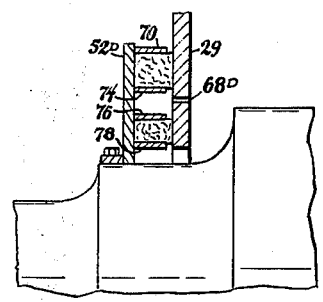
FIGS. 3, 4, and 5 are schematic views of modified forms of the same general arrangement.

In a further modified form of the invention shown in FIG. 3, the flange 52-D extends radially outward from the rotor post as a plane disc that lies in spaced relation to the end plate 29 of the housing structure to provide a clearance space therebetween. The clearance space is further divided by annular flanges 70, 74, 76, and 78 into a series of concentric chambers, the chamber between flanges 74 and 76 becoming an air chamber communicating through passageway 68-D with the high pressure within the heat exchanger. Inasmuch as the resistance of the packing band between flanges 76 and 78 is substantially less than the resistance afforded by the packing between flanges 70 and 74, pressurized fluid being supplied to the space between flanges 74 and 76 will tend to leak back into the heat exchanger rather than to the atmosphere.

The invention described herein and illustrated in the accompanying drawing is believed to admit to many modifications within the ability of persons skilled in the art and all such modifications are considered to lie within the spirit and scope of the appended claims.

I claim:

1. A regenerative heat exchange apparatus including a central rotor post, a plurality of compartments lying in lateral juxtaposition to provide a composite rotor that extends around the rotor post, means joining each compartment to the rotor post, a mass of heat absorbent material contained in the compartments of the rotor, housing means surrounding the rotor including end plates at opposite ends thereof having inlet and outlet openings that direct a heating fluid and a fluid to be heated through the heat absorbent material of the rotor, sealing means between the rotor post and the surrounding housing structure adapted to preclude the flow of fluid through the space therebetween, said sealing means comprising an annular flange attached to the rotor post in spaced relation to the end plate of the housing to provide a clearance space between the annular flange and said end plate, a plurality of independent sealing rings in said clearance space that provide a fluid chamber therebetween, a source of high pressure fluid, and an inlet for high pressure fluid connecting said source to said fluid chamber whereby said fluid chamber may be supplied with a quantity of high pressure fluid.

2. A rotary regenerative heat exchange apparatus including a sealing means as defined in claim 1 wherein the independent sealing rings are comprised of a mass of packed fibers that permit the restricted flow of fluid therethrough.

3. A rotary regenerative heat exchange apparatus including sealing means as defined in claim 2 wherein a first sealing ring lies adjacent the atmosphere and a second sealing ring lies intermediate the first sealing ring and the interior of the heat exchange apparatus.

4. A rotary regenerative heat exchange apparatus as defined in claim 1 wherein the pressure of the high pressure fluid applied to the space between annular seals exceeds the pressure of the high pressure fluid in the outlet of the heat exchanger.

5. A rotary regenerative heat exchange apparatus as defined in claim 4 wherein the first sealing ring has greater resistance to fluid flow therethrough than said second sealing ring.

6. A rotary regenerative heat exchange apparatus as defined in claim 5 having a duct connecting the high pressure fluid to the clearance space between sealing rings.

7. Regenerative heat exchange apparatus including a horizontal rotor post, sectorial compartments spaced from the rotor post and lying in lateral juxtaposition to provide an annular rotor around the rotor post, means joining each compartment to the rotor post, a mass of heat absorbent material contained in the compartments of the rotor, housing means surrounding the rotor having end plates with inlet and outlet openings that direct a heating fluid to be heated through the heat absorbent material of the rotor, means for rotating the rotor about its axis, sealing means between the rotor post and the surrounding housing structure adapted to preclude the flow of fluid through the space therebetween, said sealing means comprising a connecting flange that extends around the rotor post, an annular sleeve concentric with the rotor post with one end thereof secured to the connecting flange and having an unsupported end thereof extending axially, an annular trough extending around the rotor post supported by the housing and arranged to receive the unsupported end of the annular sleeve, and packing material carried by the annular trough adapted to resist flow of fluid through said trough.

8. A sealing arrangement for a rotary regenerative heat exchange apparatus as defined in claim 7 including means retaining the packing material adjacent opposite sides of said annular sleeve to provide an annular air chamber at the bight of said annular trough.

9. A sealing arrangement for a rotary regenerative heat exchange apparatus as defined in claim 8 wherein the means retaining the packing material adjacent the annular sleeve precludes entry thereof at the bottom of said trough.

10. A sealing arrangement for a rotary regenerative heat exchange apparatus as defined in claim 9 including an annular retainer substantially covering the annular trough to enclose the space between the end of said trough and the annular sleeve to hold the packing material therein.

11. A sealing arrangement for a rotary regenerative heat exchange apparatus as defined in claim 10 including spring means adapted to resiliently bias the annular retainer over the end of the annular trough to permit limited movement therebetween.

12. A sealing arrangement for a rotary regenerative air preheater as defined in claim 11 including an air inlet passageway adjacent the bottom of said trough, and means for supplying a quantity of air to said trough.

13. A sealing arrangement for a rotary regenerative air preheater as defined in claim 12 wherein the packing material in the annular trough which lies adjacent the outer surface of the annular sleeve has greater resistance to air flow therethrough than that which lies adjacent the inner surface of the annular sleeve whereby initial leakage of air from said trough will occur back into the heat exchanger.

* * * * *